Dec. 17, 1957     C. A. PAPPAS     2,816,563
QUICK RELEASE VALVE
Filed Dec. 28, 1954

INVENTOR:
CONSTANTINE A. PAPPAS
BY
James and Franklin
ATTORNEYS

United States Patent Office 2,816,563
Patented Dec. 17, 1957

2,816,563

QUICK RELEASE VALVE

Constantine A. Pappas, Dedham, Mass., assignor to National Pneumatic Co., Inc., Boston, Mass., a corporation of Delaware Application December 28, 1954, Serial No. 477,994

2 Claims. (Cl. 137—102)

The present invention relates to the construction of a quick release valve, and in particular to one suitable for use in a pressure braking system for vehicles.

There are many instances where, after fluid pressure has been exerted on an element, it is desired that the pressure be released in as short a period of time as possible. An example is a pressure operated braking system of the type used in many public conveyance vehicles, in which the transmission of fluid pressure to the brakes causes the brakes to be applied and the exhaust of pressure therefrom permits the brakes to release so that the vehicle may proceed. For various reasons the manual valve initially controlling the exertion of pressure to the brakes is located at a point remote from the brakes, and a pressure regulator is usually interposed between that valve and the brakes. The function of the pressure regulator is to exert on the brakes, in order to apply them, a pressure less than the maximum pressure developed in the overall system. Escape of the fluid through the pressure regulator when the brakes are to be released often takes an appreciable period of time, on the order of several seconds. During this time the brakes remain at least partially applied, and consequently the starting of the vehicle is delayed between the time that the operator of the vehicle releases the brake pedal and the time when the brakes are completely released. This time lag is objectionable, particularly when the vehicle is operated in congested traffic areas where it must stop and start quite frequently.

In order to reduce the time lag between the moment when the brake pedal is released and the moment when the brakes are completely released, I have found it desirable to interpose between the pressure regulator and the brakes a valve having an exhaust port of comparatively large area. That valve is sensitive to the pressure out of the pressure regulator and is effective, as soon as that pressure builds up as an incident to the application of the brakes, to close the exhaust port and permit the pressure to be promptly exerted on the brakes. That is, of course, an essential, since the vehicle must be capable of being brought to a quick stop in emergencies. The valve is further capable, as soon as the pressure out of the pressure regulator decreases below a predetermined value considerably above that which will permit the brakes to completely release, to open the exhaust port and provide for communication between that port and the brakes, thus permitting the pressure actually exerted on the brakes to quickly fall to a value such that the brakes will be completely released. The action of the valve in performing this function is quite rapid, and the use of the valve of the present invention in such a braking system results in the saving of several seconds each time that the brakes are released.

To this end the valve is provided with a pressure inlet port communicating with the pressure regulator or other source of pressure, a pressure outlet port leading to the brakes, and an exhaust port leading to the atmosphere or to any suitable station having a low pressure. An element is slidably mounted within the valve so as to be movable between the pressure inlet port and pressure outlet port and normally to obstruct pressure communication between those ports. The element is provided with means which, upon the application of a predetermined pressure at the inlet port, will establish communication between the pressure inlet and pressure outlet ports, the element at the same time sliding to a position such that it seals off the exhaust port. Pressure is therefore transmitted to the brakes, causing them to be applied. A spring or other resilient means tends to urge the element away from its position sealing the exhaust port, but the force of that resilient means is overcome by the pressure applied at the inlet port. However, when the pressure at the inlet port starts to decrease, as when the vehicle operator releases his brake pedal, that resilient means, aided by the pressure still exerted on the brakes, which latter pressure will exceed the pressure at the pressure inlet, will be effective to close off communication between the pressure inlet and pressure outlet ports and cause the element to slide away from the exhaust port, opening the latter and thus permitting the pressure exerted on the brakes to rapidly dissipate itself, the brakes thus releasing a considerable period of time before the pressure applied at the pressure inlet port corresponds to complete brake release.

The structure of the valve of the present invention is simple and effective, the valve may be inexpensively manufactured, and it is substantially foolproof in operation. Only a minimal number of parts are subject to wear or breakage, and even if those parts should fail the valve would still operate, although perhaps not as expeditiously as otherwise.

To the accomplishment of the above, and to such other objects as may hereinafter appear, the present invention relates to the structure of a quick release valve as defined by the appended claims and as described in this specification, taken together with the accompanying drawings in which:

Figure 2:
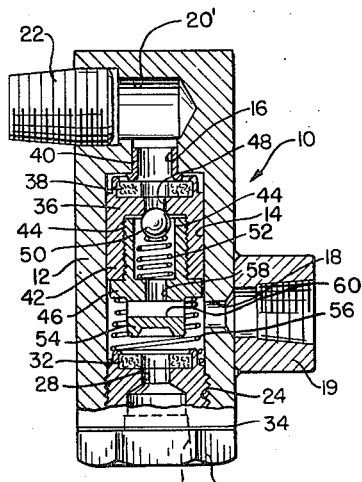
Fig. 2 is a view similar to Fig. 1 but showing the valve as a separate unit.
Figure 3:
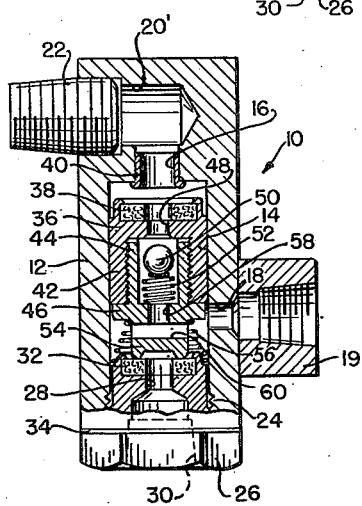
Figure 4:
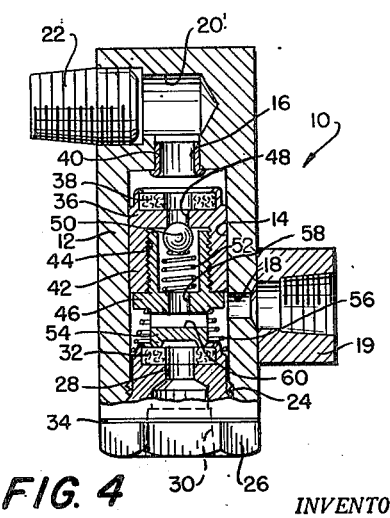

Fig. 3 is a view of the valve of Fig. 2, showing the condition which the parts assume when the pressure inlet port is in communication with the pressure outlet port so as, for example, to apply the brakes; and Fig. 4 is a view similar to Fig. 3 but showing the position which the parts assume when the pressure applied at the presure inlet port starts to drop but before the pressure outlet port is placed in communication with the exhaust outlet port.

Figure 1:
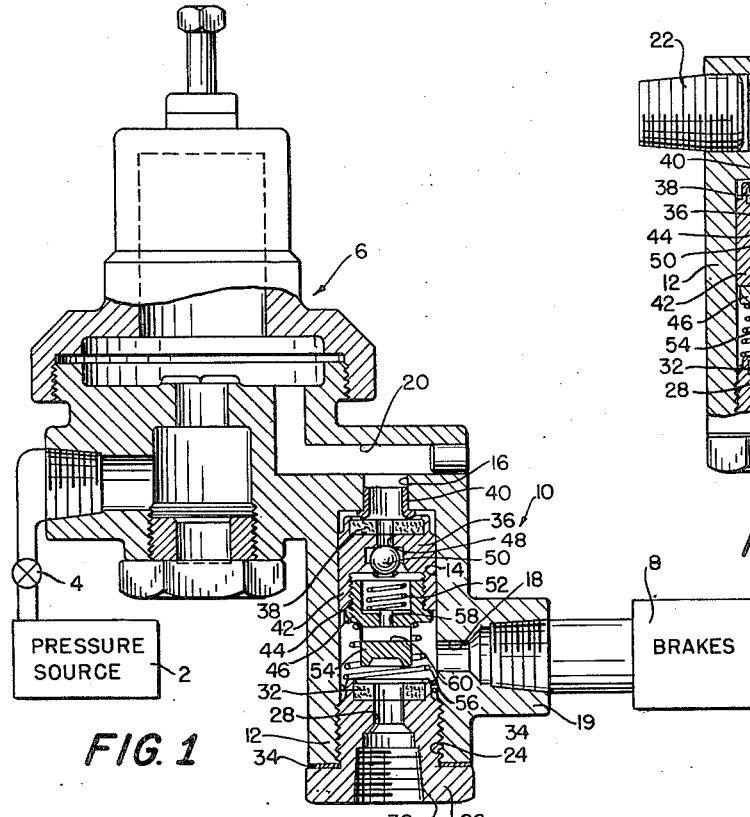
Fig. 1 is a cross sectional view of the valve of the present invention made an integral part of a conventional pressure regulator, that figure showing schematically the manner in which the pressure regulator and quick release valve are connected in a pressure braking system, the valve being shown in its standby, brake-released condition.

Fig. 1 discloses schematically a system for controlling the exertion and release of the brakes of a motor vehicle such as a bus, that system being known per se and operating on the principle that the exertion of pressure on the brakes causes the brakes to be applied and the exhaust of pressure from the brakes permits the brakes to release. The system comprises a pressure source 2, a manually actuated valve 4, a pressure regulator 6 and a brake motor 8, all connected to one another by suitable piping. The pressure fluid could be a gas such as air or a suitable hydraulic fluid. The valve 4 is actuated in any appropriate manner, usually by the movement of a brake foot pedal accessible to the vehicle operator. The pressure regulator 6 is known per se, and its construction forms no part of the present invention. Its function is to reduce the pressure directly applied to the brake motor 8 from that developed at the pressure source 2. By way of example, the pressure into the regulator may be approximately 100 p. s. i., a pressure of this magnitude being required or desired for the operation of the auxiliary equipment or safety interlocks, whereas the pressure out of the regulator may be between 35 and 40 p. s. i., this being all that is required or desired to operate the brakes. Because of the essential nature of the pressure regulator 6 fluid can pass therethrough only at a fairly slow rate, this being due largely to the necessarily restricted porting areas and passages within the regulator 6. The valve 4 is normally positioned as shown, on the side of the pressure regulator 6 remote from the brake motor 8, for several reasons. One is that the positioning of the valve 4 close to the source 2 cuts down the time lag between actuation of the valve 4 and the application of appropriate pressure to the source 8, this being a matter of considerable importance since the prompt application of the brakes is often essential in order to avoid an accident. Moreover, it is usually necessary that the valve 4 be positioned in the high pressure side of the regulator 6 because it controls other things than the brake motor 8, such as various safety interlocks. In the system as thus far described, therefore, release of the brake pedal may connect the high pressure side of the regulator 6 to exhaust via the valve 4, but the pressure fluid applied to the brake motor 8 must pass through the regulator 6 in order to exhaust, and the pressure can therefore attenuate only at a limited rate. Hence a time lag of as much as five or six seconds may elapse between the release of the brake pedal and the actual release of the brakes.

It is to cut down this time lag by an appreciable period of time on the order of several seconds that the valve of the present invention has been designed. That valve, generally designated 10, is interposed between the pressure regulator 6 and the brake motor 8. It will permit the prompt transmission of pressure from the regulator 6 to the brake motor 8, and when that pressure is released it will permit the pressure fluid in the brake motor 8 to exhaust through a path which provides for much more rapid attenuation of the pressure exerted on the brake motor 8 than does the regulator 6.

The valve 10 comprises a housing 12 provided with a central chamber 14 having a pressure inlet port 16 at the top thereof and a pressure outlet port 18 at the side thereof spaced from the port 16. The pressure outlet port 18 communicates with an internally threaded and laterally extending member 19 to which may be connected suitable piping communicating with the brake motor 8. In the embodiment shown in Fig. 1 the housing 12 is formed integral with the body of the pressure regulator 6, a passage 20 being formed in the combined bodies communicating between the interior of the regulator 6 and the valve pressure inlet 16. In the embodiment of Figs. 2–4 the valve housing 12 is a separate unit, the passage 20' communicating between the pressure inlet 16 and a threaded member 22 to which any suitable piping may be connected. Also, in the embodiment of Fig. 1 the laterally projecting member 19 is formed in one piece with the housing 12, whereas in the embodiment of Figs. 2–4 the member 19 is formed of a separate piece joined to the housing 12 by means of welding or the like. Apart from these differences the embodiments of Figs. 1 and 2–4 are substantially identical.

The bottom of the housing 12 is open and is internally threaded at 24, an externally threaded plug 26 being screwed thereinto, that plug having an axial passage 28 therethrough of appreciable area communicating with an internally threaded portion 30 to which any suitable piping may be connected. The passage 28 defines the exhaust outlet port of the valve. A sealing washer 32 of appropriate material such as synthetic rubber is mounted on the inner end of the plug 26 and is retained in place by spinning the tip of the plug thereover. It will be noted that the plug tip has an outer diameter somewhat smaller than that of the inner diameter of the chamber 14. A gasket 34 may be compressed between the plug 26 and the bottom of the housing 12 for sealing purposes.

Positioned within the chamber 14 is an element 36 snugly engaging the inner surfaces of the chamber 14 so as substantially to prevent the escape of pressure therearound, the element 36 being slidable along the chamber 14 between the positions shown in Figs. 1 and 2 on the one hand and the positions shown in Figs. 3 and 4 on the other hand. The element 36 carries at its upper end a washer 38 held in place by having the upper tip of the element 36 spun thereover, the washer 38 being formed of any suitable material such as synthetic rubber. The element 36 may advantageously be formed of brass. When the element 36 is in its position shown in Figs. 1 and 2 the washer 38 will engage an eyelet 40 securely fitted within the pressure inlet port 16, this engagement limiting the upward movement of the element 36 and preventing passage of pressure fluid through the inlet port 16 and around the element 36.

The element 36 is provided with a depending internally threaded skirt 42 within which the upwardly extending end 44 of a second element section 46 is received. An axial passage 48 is formed in the element 36 and the washer 38, the lower end of that passage terminating in a valve seat against which a valve ball 50 is adapted to seat, that ball 50 being urged upwardly toward seating position by means of a compression spring 52 operative between the lower end of the ball 50 and a seat defined by the second element section 46.

The second element section 46 is provided with a depending portion 54 of reduced cross section adapted, when the element sections 36 and 46 are moved downwardly to the position shown in Figs. 3 and 4, to engage the washer 32 carried by the element 26. This limits the downward movement of the element 36, 46 and also seals off the exhaust outlet port 28 from the interior of the chamber 14. A compression spring 56 is operative between the tip of the plug 26 and the element part 46 so as to urge the element 36, 46 upwardly to its position shown in Figs. 1 and 2, in which position the depending portion 54 of the element part 46 is upwardly spaced from the washer 32, thus opening the exhaust outlet port 28 to the chamber 14. The element part 46 is provided with an axial passage 58 communicating on the one hand with the passage 48 and on the other hand with a lateral passage 60 which opens into the interior of the chamber 14 in the vicinity of the pressure outlet port 18.

The operation of the valve 10 is as follows: It will normally assume the condition shown in Figs. 1 and 2, the spring 56 moving the element 36, 46 upwardly and the spring 52 moving the ball 50 upwardly. In this condition the pressure outlet port 18 will be in direct communication with the exhaust outlet port 28 and will be sealed from the pressure inlet port 16. Pressure will therefore be exhausted from the brake motor 8 and the brakes will be released.

When the manual valve 4 is actuated to apply pressure to the brakes that pressure will be applied via the pressure regulator 6 to the upper surface of the element 36, 46. Since the pressure applied to the lower surface thereof is low and possibly at atmospheric pressure the pressure differential applied to the element 36, 46 will overcome the force of the spring 56 and that element will move downwardly to its position shown in Fig. 3. The strength of the spring 56 may be such as to permit this movement when the pressure applied at the pressure inlet port 16 is on the order of 10 or 15 p. s. i. This will result in the sealing of the exhaust outlet port 28. The spring 52 is stronger than the spring 56, and consequently the ball 50 will not be moved away from its seat until the pressure applied at the pressure inlet port 16 has a somewhat higher value, usually approximately 30 p. s. i. As soon as the ball 50 moves to its position shown in Fig. 3 the pressure inlet port 16 and the pressure outlet port 18 will be in communication, pressure will be transmitted to the brake motor 8, and the brakes will be applied.

When the manual valve 4 is actuated to effect release of the brakes, the pressure applied at the pressure inlet port 16 will slowly lessen. The first result will be that the spring 52 will restore the ball 50 to its upper position, sealing the passage 48. This position is illustrated in Fig. 4. The next result, quickly following thereupon, will be that the pressure differential between the pressure at the pressure inlet port 16 on the one hand, which is applied to the upper end of the element 36, 46, and the pressure at the pressure outlet port 18 on the other hand, which is applied to the lower end of the element 36, 46, together with the force of the spring 56, will cause the element 36, 46 to move rapidly to its upper position shown in Figs. 1 and 2. This will open the exhaust outlet port 28 and consequently will permit the pressure applied to the brake motor 8 to quickly exhaust without having to pass through the pressure regulator 6. As a result the pressure applied to the brake motor 8 will fall to a value permitting complete release of the brakes several seconds before the pressure at the pressure inlet 16 achieves that value.

The valve of the present invention is compact, readily manufactured, has a minimum number of moving parts, and all of those parts are readily accessible for repair or replacement merely by removing the bottom plug 26.

While the valve of the present invention has been here specifically described as used in a pressure braking system for vehicles, it will be obvious that it may be used as well in numerous other applications. While but essentially a single embodiment of the valve has been here specifically disclosed, it will further be apparent that many variations may be made in the details thereof, without departing from the spirit of the invention as defined in the following claims.

I claim:

1. A quick release valve comprising a housing having a pressure inlet, a pressure outlet, and an exhaust outlet all communicating with a passage, an element in said passage between said pressure inlet and said pressure outlet and effective to block pressure communication therebetween, means for permitting pressure to pass said element, a spring loaded valve carried by said element, operative independently of the position of said element, and normally closing said means, said valve being pressure-sensitive and effective to open said means when the pressure applied at said pressure inlet exceeds a predetermined amount, said element being movable in said passage between a first position closing said exhaust outlet and a second position opening said exhaust outlet, said exhaust outlet being positioned on the other side of said element from said pressure inlet, and said element having a rigidly connected part engageable with said exhaust outlet when said element is in its first position for closing the latter, and resilient means for urging said element to its second position, the position of said element thus being controlled by the pressure applied at said pressure inlet, said element being moved to its first position by a lower pressure at said pressure inlet than is required to open said valve on said element, said element having a passage therethrough extending from said means toward said pressure and exhaust outlets, said spring loaded valve being inside said passage, and a separable member secured to said element and extending therefrom toward said exhaust outlet, said member closing the end of said passage remote from said means, said member defining a support for said spring loaded valve and having a passage therethrough communicating between said passage in said element and the side of the extending portion of said member, said part engageable with said exhaust outlet for closing the same being carried by said member axially beyond said member passage.

2. A quick release valve comprising a housing having a chamber, a pressure inlet at one end thereof, and a pressure outlet and an exhaust outlet at the other end thereof, an element sealingly seated within said chamber and slidable therealong between first and second positions in each of which said element is operatively between said pressure inlet and said pressure outlet, a first resilient means active on said element to urge it to its second position toward said pressure inlet, said element when moved to its first position away from said pressure inlet operatively closing said exhaust outlet but leaving said pressure outlet open, said element having a passage therethrough communicating between said pressure inlet and said pressure outlet, said passage including a valve opening, a valve element carried by said element and positioned on the side of said valve opening remote from said pressure inlet, and second resilient means urging said valve element to valve closing position, said first resilient means being weaker than said second resilient means, said element having a passage therethrough extending from said valve opening toward said pressure and exhaust outlets, said valve element and said second resilient means being inside said passage, and a separable member secured to said element and extending therefrom toward said exhaust outlet, said member closing the end of said passage remote from said valve opening, said member defining a support for said second resilient means and having a passage therefrom communicating between said passage in said element and the side of the extending portion of said element, said member rigidly carrying a part axially beyond said member passage which engages with said exhaust outlet when said member is in its first position.

References Cited in the file of this patent

UNITED STATES PATENTS

| 2,270,549 | Orr | Jan. 20, 1942 |
| 2,702,044 | Johnston | Feb. 15, 1955 |

FOREIGN PATENTS

| 707,165 | Great Britain | Apr. 14, 1954 |